US011542922B2

(12) United States Patent
Wood et al.

(10) Patent No.: US 11,542,922 B2
(45) Date of Patent: Jan. 3, 2023

(54) ELECTRO-THERMAL HEATING SYSTEM FOR WIND TURBINE BLADES

(71) Applicant: VESTAS WIND SYSTEMS A/S, Aarhus N (DK)

(72) Inventors: Arran Wood, Cowes (GB); Stephen Buggy, Cowes (GB); Paul Badger, Salisbury (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 146 days.

(21) Appl. No.: 16/627,465

(22) PCT Filed: Jun. 21, 2018

(86) PCT No.: PCT/DK2018/050160
§ 371 (c)(1),
(2) Date: Dec. 30, 2019

(87) PCT Pub. No.: WO2019/001669
PCT Pub. Date: Jan. 3, 2019

(65) Prior Publication Data
US 2021/0148338 A1 May 20, 2021

(30) Foreign Application Priority Data

Jun. 30, 2017 (DK) .............................. PA201770535

(51) Int. Cl.
*F03D 80/60* (2016.01)
*F03D 17/00* (2016.01)
(Continued)

(52) U.S. Cl.
CPC ............. *F03D 80/60* (2016.05); *F03D 17/00* (2016.05); *F03D 80/40* (2016.05); *H05B 1/0225* (2013.01);
(Continued)

(58) Field of Classification Search
CPC .......... F03D 17/00; F03D 80/40; F03D 80/60; H05B 1/023; H05B 3/0009; H05B 2214/02
See application file for complete search history.

(56) References Cited

U.S. PATENT DOCUMENTS 6,194,685 B1 * 2/2001 Rutherford ............ B64D 15/14
219/201
9,133,575 B2 * 9/2015 Hong ...................... D06F 25/00
(Continued)

FOREIGN PATENT DOCUMENTS

| CA | 2883167 A1 | 8/2015 |
| CN | 2883167 Y | 3/2007 |

(Continued)

OTHER PUBLICATIONS

Danish Patent and Trademark Office Search Opinion for PA 2017 70535 dated Jan. 24, 2018.
(Continued)

*Primary Examiner* — Richard A Edgar
*Assistant Examiner* — Jason G Davis
(74) *Attorney, Agent, or Firm* — Patterson + Sheridan, LLP

(57) ABSTRACT

The present invention relates to a method of controlling an electro-thermal heating system in a wind turbine blade, comprising measuring a supply voltage to the electro-thermal heating system, determining a duration of a variable time based enforced off period based on the measured supply voltage, and inserting the variable time based enforced off period between subsequent switching duty cycles that controls the electro-thermal heating system. The present invention also relates to a wind turbine that comprises one or more wind turbine blades wherein each wind turbine blade com-
(Continued)

prises an electro-thermal heating system and a processor adapted to perform the method.

13 Claims, 3 Drawing Sheets

(51) Int. Cl.
   *F03D 80/40* (2016.01)
   *H05B 3/00* (2006.01)
   *H05B 1/02* (2006.01)

(52) U.S. Cl.
   CPC ........ *F05B 2270/303* (2013.01); *H05B 1/023* (2013.01); *H05B 3/0009* (2013.01); *H05B 2214/02* (2013.01)

(56) References Cited

U.S. PATENT DOCUMENTS

| | | | |
|---|---|---|---|
| 9,872,340 B2* | 1/2018 | Dahlqvist | G03B 37/02 |
| 2005/0253563 A1 | 11/2005 | Logsdon | |
| 2012/0318923 A1 | 12/2012 | Stonestreet, II et al. | |
| 2013/0300117 A1* | 11/2013 | Hjort | F03D 9/25 290/44 |
| 2014/0217079 A1* | 8/2014 | Nelson | H05B 3/26 219/202 |
| 2015/0023792 A1 | 1/2015 | Spitzner et al. | |
| 2015/0208727 A1* | 7/2015 | Kuczaj | H05B 1/0244 219/492 |
| 2015/0244297 A1 | 8/2015 | Niemoeller et al. | |
| 2016/0084231 A1* | 3/2016 | Runge | F03D 7/00 416/1 |

FOREIGN PATENT DOCUMENTS

| | | |
|---|---|---|
| CN | 104737263 A | 6/2015 |
| CN | 104937263 A | 9/2015 |
| EP | 2913520 A1 | 9/2015 |
| WO | 2015075068 A1 | 5/2015 |
| WO | 2017108064 A1 | 6/2017 |
| WO | 2019001669 A1 | 1/2019 |

OTHER PUBLICATIONS

PCT Written Opinion of the International Searching Authority for PCT/DK2018/050160 dated Jan. 17, 2018.
PCT International Search Report for PCT/DK2018/050160 dated Sep. 13, 2018.
Sabatier J et al: 11 Crone control based anti-icing/deicing system for wind turbine blades 11 Control Engineering Practice, Pergamon Press, Oxford, GB, vol. 56, Aug. 11, 2016.
Chinese Office Action for Application No. 201880043951.3 dated Jul. 9, 2020.
Danish Patent and Trademark Office, 1st Technical Examination including the Search Report and Search Opinion for Application PA 2017 70535 dated Jan. 24, 2018.

* cited by examiner

ND Turbine Blades

ELECTRO-THERMAL HEATING SYSTEM FOR WIND TURBINE BLADES

The present invention is directed to an improved Electro-Thermal Heating (ETH) system and, in particular, to control method to normalise the power output in the Electro-Thermal Heating system.

BACKGROUND

Wind turbines generate electrical power from wind energy and can be situated on land or off-shore. Wind turbines situated in cold climates can suffer from icing events where ice may be formed on the surface of the wind turbine blades due to freezing water on the cold surface. The accumulation of ice on the surface of a blade can result in undesirable consequences. For example, a change in the profile of the wind turbine blades due to the accumulation of ice may reduce the speed of rotation of the wind turbine or change the angle of attack of the blade which can affect the thrust generated by the rotor of the wind turbine and the power generated by the wind turbine. As a result, the wind turbine may operate below optimal speed and efficiency which degrades the performance of the wind turbine. Also, the additional weight of the accumulating ice on the wind turbine blades may cause fatigue and stress failures of the blades.

Therefore, there is a need to be able to prevent or reduce the effects of icing on the blades of a wind turbine in order to prevent damage to the blades and also to increase the performance of a wind turbine.

Various systems and methods have been described to either, or both, to de-ice (e.g. remove ice accumulated) a wind turbine or to provide anti-icing (e.g. prevent ice from accumulating) for a wind turbine.

For example, it is known to attach to, or embed within, a wind turbine blade several Electro-Thermal Heating (ETH) elements to form an ETH system which, when supplied with electrical power, generate heat to increase the surface temperature of the surface of the blade. Such ETH elements may be used for either or both of anti-icing or de-icing of the wind turbine blade.

The ETH system is typically controlled by switching on and off the ETH elements according to a predetermined and specified switching cycle to generate the required heat at the required locations in the wind turbine blade. However, a critical control parameter, such as the supply voltage, of the ETH system may fluctuate which can affect the power output of the ETH system and may cause damage to the ETH system and/or to the blade by, for example, increasing the heat generated by the ETH system to be above design limits.

The present invention seeks to address, at least in part, the problems and disadvantages described hereinabove and to seek to provide a method to compensate for fluctuations in control parameters of the ETH system.

STATEMENT OF INVENTION

According to a first aspect of the present invention there is provided a method of controlling an electro-thermal heating system in a wind turbine blade, comprising: measuring a supply voltage to the electro-thermal heating system; determining a duration of a variable time enforced off period based on the measured supply voltage; and inserting the variable time enforced off period in a switching duty cycle or between consecutive switching duty cycles, wherein the switching duty cycles control the electro-thermal heating system.

Therefore the present invention advantageously compensates for supply voltage fluctuations by inserting a variable time enforced off period based on the measured supply voltage.

The supply voltage may be measured using a voltage sensor. The supply voltage may be measured using a current sensor.

The method may further comprise determining a ratio between the measured supply voltage and a predefined design voltage; and determining the duration of the variable time enforced off period based on the determined ratio between the measured supply voltage and the predefined design voltage. The predefined design voltage may be equal to the nominal voltage of the electro-thermal heating system. The predefined design voltage may be set at a voltage value between a minimum voltage and a nominal voltage of the electro-thermal heating system. The nominal voltage may be the rated voltage for the ETH system and the minimum voltage may be the minimum voltage that is sufficient to operate the ETH system.

The electro-thermal heating system may comprises a plurality of electro-thermal heating elements located on or in the wind turbine blade; and the plurality of electro-thermal heating elements may be controlled according to the switching duty cycles.

Determining the duration of the variable time enforced off period may be based on one or more of a predefined design voltage, and the total switching time of a switching duty cycle.

The duration of the variable time enforced off period may be determined using:

$$t_i = T\left(1 - \frac{V_D^2}{V_I^2}\right)$$

wherein:
$t_i$=Duration of the variable time enforced off period;
$V_D$=Predefined Design Voltage;
T=Total Switching Duty Cycle Time; and
$V_I$=Measured Supply Voltage.

The determined variable time enforced off period may be inserted within a switching duty cycle.

The variable time enforced off period may be determined using:

$$t_i = T\left(\frac{V_I^2}{V_D^2} - 1\right)$$

wherein:
$t_i$=Duration of the variable time enforced off period;
$V_D$=Predefined Design Voltage;
T=Total Switching Duty Cycle Time; and
$V_I$=Measured Supply Voltage.

The determined variable time enforced off period may be inserted between consecutive switching duty cycles.

The duration of the variable time based enforced off period may compensate for supply voltage fluctuations in order to normalize a power output of the electro-thermal heating system.

According to a second aspect of the present invention there is provided a wind turbine comprising: one or more wind turbine blades, wherein each wind turbine blade comprises an electro-thermal heating system; a sensor for measuring a supply voltage to the electro-thermal heating system; and a processor adapted to perform any one of the methods or features described hereinabove.

According to a third aspect of the present invention there is provided a computer program product comprising computer readable executable code for implementing any one of the methods or features described hereinabove.

DRAWINGS

Embodiments of the present invention will now be described, by way of example only, and with reference to the accompanying drawings, in which.

EMBODIMENTS

Figure 1:
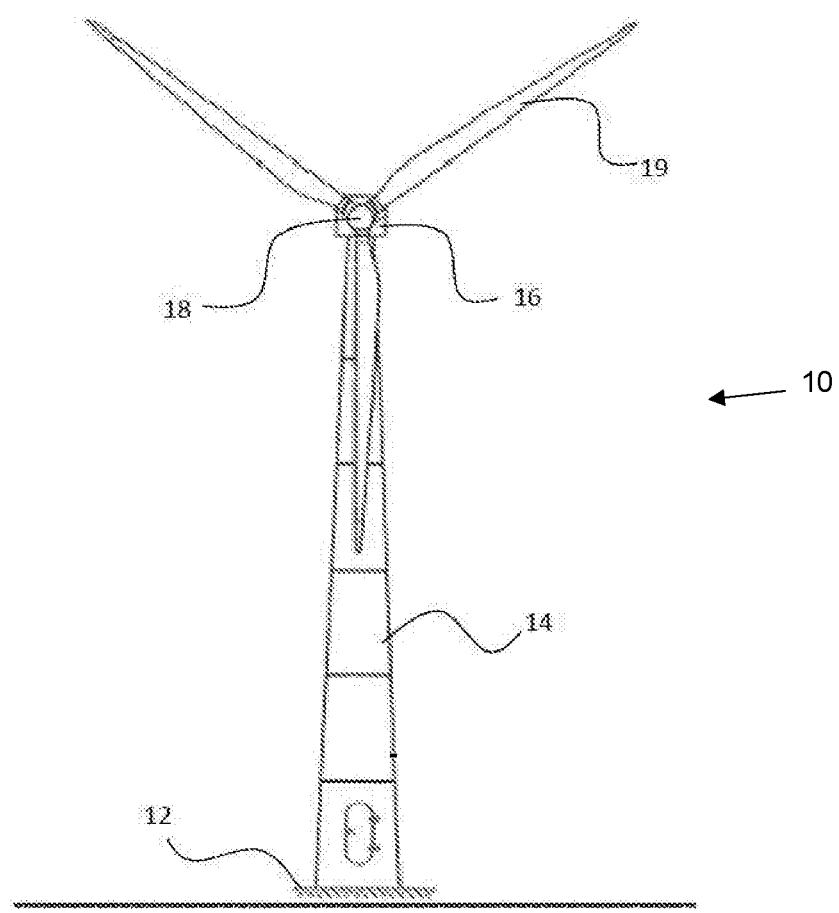
FIG. 1 shows a schematic of a wind turbine according to one or more embodiments of the present invention.

FIG. 1 shows a schematic of a typical wind turbine 10 which includes embodiments of wind turbine blades 19 according to the present invention. The wind turbine 10 is mounted on a base 12 which may be onshore foundations or off-shore platforms or foundations. The wind turbine includes a tower 14 having a number of tower sections. A nacelle 16 is located and attached to the top of tower 14. A wind turbine rotor, connected to the nacelle 16, includes a hub 18 and at least one wind turbine blade 19, where in FIG. 1 three wind turbine blades are shown although any number of wind turbine blades 19 may be present depending on the design and implementation of the wind turbine 10. The wind turbine blades 19 are connected to the hub 18 which in turn is connected to the nacelle 16 through a low speed shaft which extends out of the front of the nacelle 16.

Figure 2:
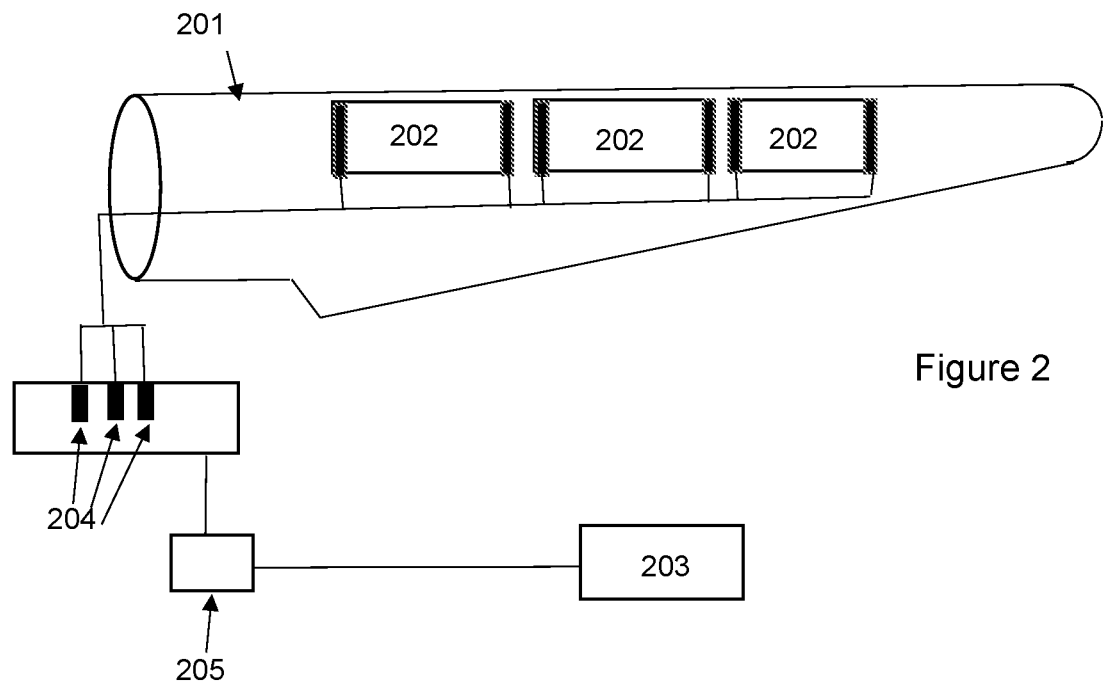
FIG. 2 shows a schematic of a wind turbine blade having a plurality of resistive elements according to one or more embodiments of the present invention.

With reference to FIG. 2, a wind turbine blade 201 may have attached thereto, or embedded within, a plurality of ETH elements 202 as part of an ETH system for generating heat to substantially prevent or remove ice accretion from the wind turbine blade 201.

Each of the plurality of ETH elements 202 is connected to a power supply 203 via a bank of electrical contacts 204, such as an electrical relay. Each electrical contact 204 is operatively coupled to one or more predetermined ETH elements 202 in order to switch the predetermined ETH elements 202 on and off. A sensor 205 is connected to ETH system to measure the voltage supplied to the ETH system. The sensor 205 may be a voltage sensor to measure the voltage directly or a current sensor to determine the voltage based on the current, where either can be used to measure the voltage supplied to the ETH system.

Depending on environmental or icing conditions a predetermined number or pattern of ETH elements 202 are activated according to a predefined switching duty cycle. The switching duty cycle (e.g. switching on and off relays over a period of time) enables a power distribution across the ETH elements attached to, or embedded within, the blade in a predefined manner. During a switching duty cycle any number of the ETH elements 202 may be switched on so as to generate heat in the predetermined sections of the blade based on the heating requirements at that given time.

A switching duty cycle may be for any predetermined time period, e.g. 10 seconds, 20 seconds, 30 seconds, and so on, suitable for controlling the ETH elements as required for generating the necessary heat at the required locations in the wind turbine blade. During the switching duty cycle predetermined any number of resistive elements 202 may be switched on and off based on a predefined cycle.

Each ETH element 202 is switched on and off from the power supply via the corresponding electrical contact 204 according to the predefined switching duty cycle. As such, when the electrical contact 204 for a given ETH element 202 is connected, i.e. switched on, the corresponding ETH element 202 receives electrical power as it is connected to the power supply, which causes heat to be generated by the ETH element 202. In contrast, when the when the electrical contact 204 for a given ETH element 202 is disconnected or open, i.e. switched off, the corresponding ETH element 202 does not receive any electrical power from the power supply.

During operation of the ETH system the voltage supplied may fluctuate which can cause the ETH elements of the ETH system to generate more heat than they are expected or designed to generate. The ETH system may be supplied from the grid to which the wind turbine is connected or supplied from the electrical power generated by the wind turbine where, in both cases, the supplied voltage may fluctuate above a predefined design voltage. Therefore, in order to compensate for, or to normalize the power output of the ETH system when, fluctuations in the supply voltage occur above a predefined design voltage, it has been identified that a variable time off period can be inserted within a switching duty cycle or between two consecutive switching duty cycles.

Figure 3:
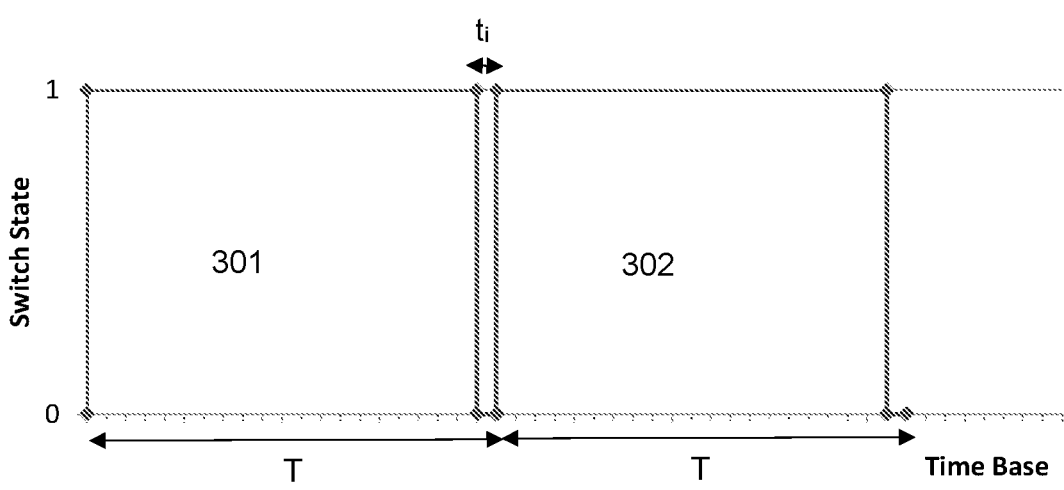
FIG. 3 shows a switching duty cycle for a plurality of resistive elements according to one or more embodiments of the present invention.

With reference to FIG. 3, a variable time off period can be inserted within a switching duty cycle. FIG. 3 shows two switching duty cycles 301, 302 for a predetermined plurality of ETH elements. The ETH elements controlled by the switching duty cycle 301, 302 may be all of the ETH elements or a subset of the total number of ETH elements, for example, the ETH elements in a particular zone or area of the blade such as the leading edge.

In this example of FIG. 3, all of the plurality of ETH elements are to be switched on during the switching duty cycle 301 and also during the subsequent switching duty cycle 302.

In order to normalize the power output of the heating system when the supplied voltage fluctuates above a predefined design value during the first duty cycle 301 a variable time based enforced off period $t_i$ is inserted during the first switching duty cycle 301. The duration of the variable time based enforced off period $t_i$ is variably adjusted proportionally based on the measured voltage supply to compensate for any fluctuation in the voltage.

The supply voltage is constantly measured, or measured at predetermined times, and any fluctuation above the predefined design voltage value is used to determine the required variable time based enforced off period $t_i$ to be inserted within the switching duty cycle. In this example of FIG. 3, the variable time based enforced off period $t_i$ is inserted towards the end of the duty cycle 301, however, as will be appreciated the variable time based enforced off period $t_i$ may be inserted at a different point in the switching duty cycle.

The duration of the variable time based enforced off period $t_i$ to be inserted within the switching duty cycle may be determined by the following:

$$t_i = T\left(1 - \frac{V_D^2}{V_f^2}\right)$$

wherein:
$t_i$=Duration of the variable time based enforced off period;
$V_D$=Predefined Design Voltage;
T=Total Switching Duty Cycle Time;
$V_f$=Measured Voltage supply.

The determined variable time off period $t_i$ is then inserted within the total time T of the switching duty cycle 301 to compensate for the voltage fluctuations in the measured supply voltage.

Figure 4:
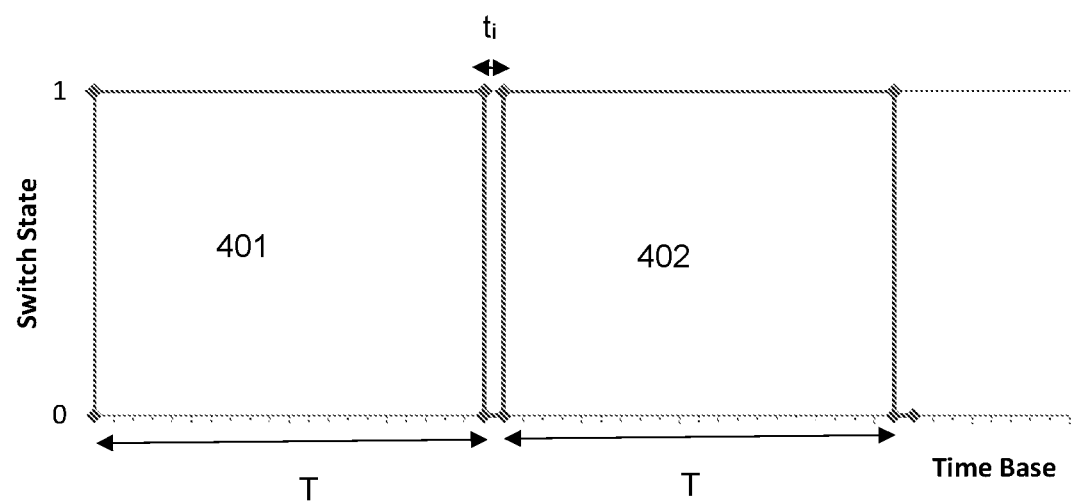
FIG. 4 shows a switching duty cycle for a plurality of resistive elements according to one or more embodiments of the present invention.

With reference to FIG. 4, a variable time off period can be inserted between consecutive switching duty cycles. FIG. 4 shows two switching duty cycles 401, 402 for a predetermined plurality of ETH elements. The ETH elements controlled by the switching duty cycle 401, 402 may be all of the ETH elements or a subset of the total number of ETH elements, for example, the ETH elements in a particular zone or area of the blade such as the leading edge.

In this example of FIG. 4, all of the plurality of ETH elements are to be switched on for the entire period T of the switching duty cycle 401 and also for the entire period T of the subsequent switching duty cycle 402.

In order to normalize the power output of the heating system when the supplied voltage fluctuates above a predefined design value a variable time based enforced off period $t_i$ is inserted between the two switching duty cycles 401, 402. The duration of the variable time based enforced off period $t_i$ is variably adjusted proportionally based on the measured voltage supply to compensate for any fluctuation in the supply voltage.

The supply voltage is constantly measured, or measured at predetermined times, and any fluctuation above the predefined design voltage value is used to determine the required variable time based enforced off period $t_i$ to be inserted between the consecutive switching duty cycles.

The duration of the variable time based enforced off period $t_i$ to be inserted within the switching duty cycle may be determined by the following:

$$t_i = T\left(\frac{V_f^2}{V_D^2} - 1\right)$$

wherein:
$t_i$=Duration of the variable time based enforced off period;
$V_D$=Predefined Design Voltage;
T=Total Switching Duty Cycle Time;
$V_f$=Measured Voltage supply.

The determined variable time off period $t_i$ is then inserted between the two switching duty cycle 401, 402 to compensate for the voltage fluctuations in the measured supply voltage.

The predefined design voltage described hereinabove may be set at the nominal voltage, e.g. the expected designed voltage, for the ETH system or may be set at a voltage below the nominal voltage. The design voltage may be set at a voltage lower than the nominal voltage (for example, between a minimum voltage for the ETH system and the nominal design voltage) in order to take into account any periods of under voltage, e.g. periods where the supply voltage is below the expected supply voltage, and/or to provide a safety margin for the operation of the ETH system, and/or to enable a higher power output ETH element to be used but at a lower voltage than can be supplied to the ETH system.

Therefore, the present invention advantageously enables the ETH system to compensate for supply voltage fluctuations in order to normalize the power output of the ETH system and prevent any damage to the ETH system caused by supply voltage fluctuations.

The examples and embodiments described above are for example purposes only, and it will be appreciated that features of different embodiments or examples may be combined with one another. Embodiments of the present invention have been described, by way of example only, and many modifications or changes may be made to the embodiments and be within the scope of the appended claims.

The invention claimed is:

1. A method of controlling an electro-thermal heating system, comprising:
    measuring a supply voltage to the electro-thermal heating system, wherein the electro-thermal heating system comprises a plurality of electro-thermal heating elements located on or in a wind turbine blade;
    determining a ratio between the measured supply voltage and a design voltage;
    determining a duration of a variable time-based enforced off period based on the ratio between the measured supply voltage and the design voltage; and
    inserting the variable time-based enforced off period in a switching duty cycle or between consecutive switching duty cycles, wherein the switching duty cycles control the plurality of electro-thermal heating elements.

2. The method according to claim 1, wherein the supply voltage is measured using a voltage sensor.

3. The method according to claim 1, wherein the supply voltage is measured using a current sensor.

4. The method according to claim 1, wherein the design voltage is equal to the nominal voltage of the electro-thermal heating system.

5. The method according to claim 1, wherein the design voltage is set at a voltage value between a minimum voltage and a nominal voltage of the electro-thermal heating system.

6. The method according to claim 1, wherein determining the duration of the variable time-based enforced off period is further based on one or more of a predefined design voltage, and a total switching time of the switching duty cycle.

7. The method according to claim 6, wherein the duration of the variable time-based enforced off period is determined using:

$$t_i = T\left(1 - \frac{V_D^2}{V_f^2}\right)$$

wherein:
$t_i$=Duration of the variable time-based enforced off period;
$V_D$=Predefined Design Voltage;
T=Total Switching Duty Cycle Time; and
$V_f$=Measured Supply Voltage.

8. The method as claimed in claim 7, wherein the determined variable time-based enforced off period is inserted within the switching duty cycle.

9. The method according to claim 6, wherein the duration of the variable time-based enforced off period is determined using:

$$t_i = T\left(\frac{V_I^2}{V_D^2} - 1\right)$$

wherein:
$t_i$=Duration of the variable time-based enforced off period;
$V_D$=Predefined Design Voltage;
T=Total Switching Duty Cycle Time; and
$V_I$=Measured Supply Voltage.

10. The method according to claim 9, wherein the determined variable time-based enforced off period is inserted between consecutive switching duty cycles.

11. The method according to claim 1, wherein the duration of the variable time-based enforced off period compensates for supply voltage fluctuations in order to normalize a power output of the electro-thermal heating system.

12. A wind turbine comprising:
one or more wind turbine blades, wherein at least one of the wind turbine blades comprises an electro-thermal heating system, wherein the electro-thermal heating system comprises a plurality of electro-thermal heating elements located on or in the at least one of the wind turbine blades;
a sensor for measuring a supply voltage to the electro-thermal heating system; and
a processor adapted to:
determine a ratio between the measured supply voltage and a design voltage;
determine a duration of a variable time enforced off period based on the ratio between the measured supply voltage and the design voltage; and
insert the variable time enforced off period in a switching duty cycle or between consecutive switching duty cycles, wherein the switching duty cycles control the plurality of electro-thermal heating elements.

13. A computer program product comprising a non-transitory computer readable medium storing computer readable executable code which, when executed by a processor, performs an operation for controlling an electro-thermal heating system, the operation comprising:
measuring a supply voltage to the electro-thermal heating system, wherein the electro-thermal heating system comprises a plurality of electro-thermal heating elements located on or in a wind turbine blade;
determining a ratio between the measured supply voltage and a design voltage;
determining a duration of a variable time-based enforced off period based on the ratio between the measured supply voltage and the design voltage; and
inserting the variable time-based enforced off period in a switching duty cycle or between consecutive switching duty cycles, wherein the switching duty cycles control the plurality of electro-thermal heating elements.

* * * * *